United States Patent [19]

Patry

[11] 4,003,175
[45] Jan. 18, 1977

[54] FASTENER AND ROOF ARRANGEMENT USING THE FASTENER

[75] Inventor: Francis Joseph Patry, Lewiston, Maine

[73] Assignee: Johns-Manville Corporation, Denver, Colo.

[22] Filed: June 30, 1975

[21] Appl. No.: 591,585

[52] U.S. Cl. ............................... 52/506; 52/549; 85/1 P; 85/21; 85/DIG. 2
[51] Int. Cl.² ......................................... E04B 1/38
[58] Field of Search ................. 52/364, 548, 622; 85/1 P, DIG. 2, 21, 30, 5 M, 10 F, 23

[56] References Cited

UNITED STATES PATENTS

| 2,724,303 | 11/1955 | Holcomb | 85/DIG. 2 |
|---|---|---|---|
| 2,967,448 | 1/1961 | Hallock | 85/21 |
| 3,238,835 | 3/1966 | Rosenberg | 85/7 |
| 3,461,772 | 8/1969 | Barry | 85/21 X |

FOREIGN PATENTS OR APPLICATIONS

| 216,957 | 9/1958 | Australia | 85/DIG. 2 |

Primary Examiner—Price C. Faw, Jr.
Assistant Examiner—Carl D. Friedman
Attorney, Agent, or Firm—Robert M. Krone; Joseph J. Kelly; Stephen C. Shear

[57] ABSTRACT

A roof arrangement including a metal roof deck and roof insulation sheet material positioned on top of the deck is disclosed herein. The roof insulation sheet material is fastened to the deck utilizing a roof fastener which is also disclosed herein. This fastener includes a longitudinal body with a pointed metal tip affixed to one end of the body. The longitudinal body has a circumferential outer portion located adjacent to and extending longitudinally back from the metal tip. This circumferential outer portion has a maximum outer cross-section greater than that of the metal tip and is constructed of a non-metallic material having a lower hardness than that of the tip.

3 Claims, 4 Drawing Figures

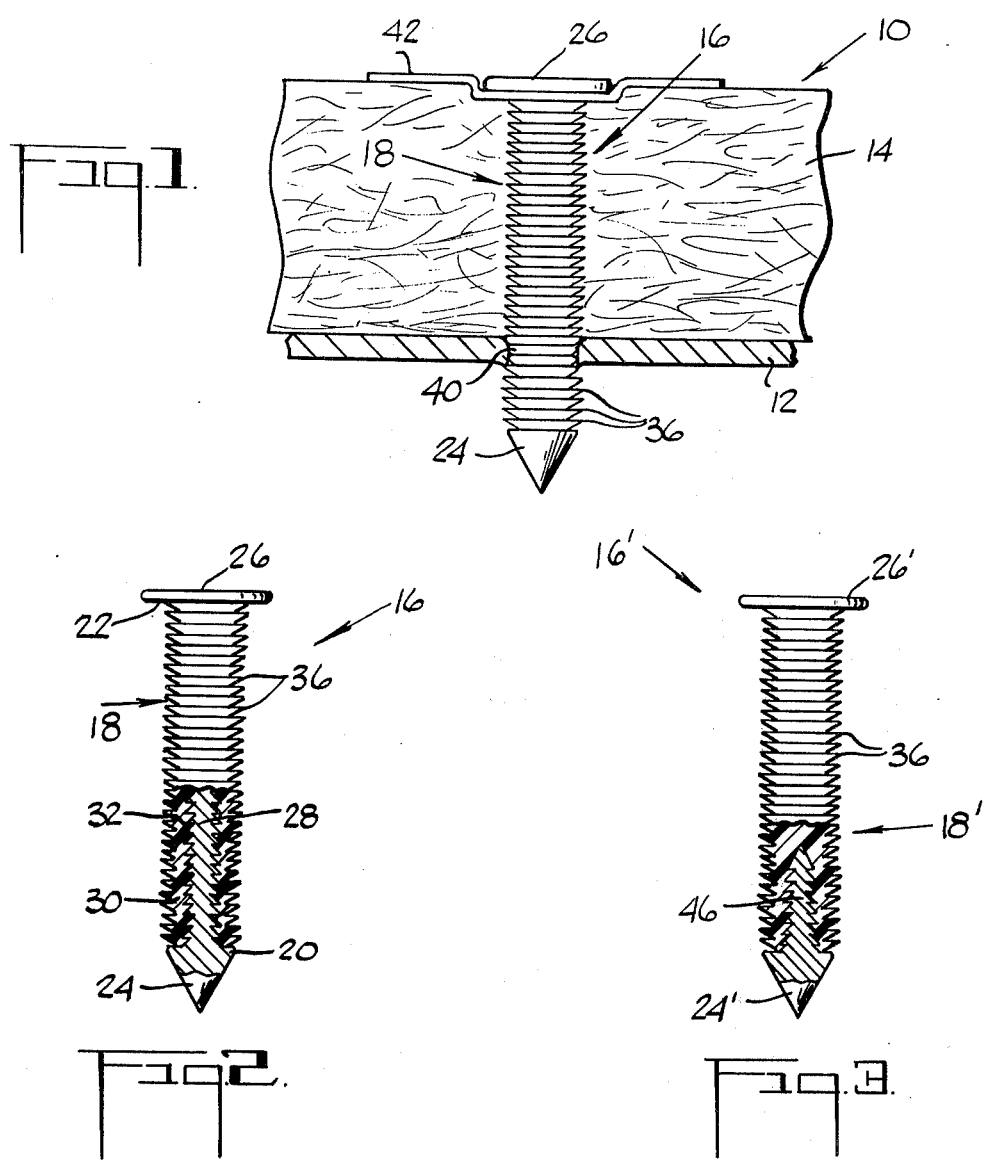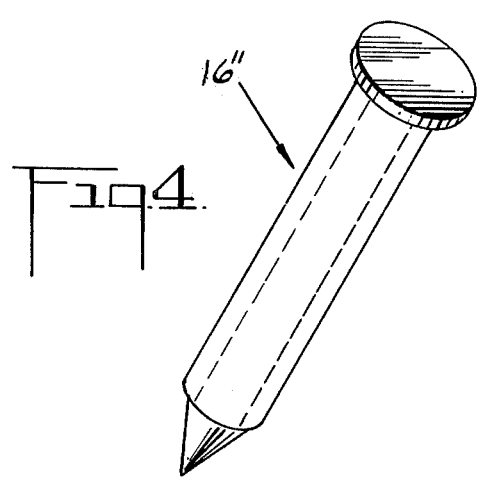

FASTENER AND ROOF ARRANGEMENT USING THE FASTENER

BACKGROUND OF THE INVENTION

The present invention relates generally to roof arrangements and fasteners and more particularly to a roof arrangement including a metal deck and a particular fastener which is especially suitable for use with roof arrangements including metal decks.

A typical roof structure includes a deck and a protective deck covering. Where the roof structure is sloped, for example residential use, the protective roof covering is generally comprised of roof shingles. On the other hand, where the roof structure is relatively horizontal which is for example typical in industrial structures, the protective covering generally includes roof insulation in sheet form located directly over the deck and a built-up roof over the insulation.

When insulation in sheet material form is used and when the deck is constructed of wood, it is quite easy to fasten the insulation to the deck. This is typically accomplished by means of nails. However, where the deck is constructed of metal, which is often the case, standard nails have not been found to be acceptable. One reason for this is that the nails once driven through the metal deck do not reliably remain in place and hence do not securely hold down the roof insulation. Applicant has found that to provide the metal nails with serrations does not correct this problem since the openings in the deck will generally be as large in cross-section as or slightly larger than that of the serration and hence the nail holding capability is not substantially improved. In addition, whether the metal nails or smooth or serrated, these nails do not adequately liquid seal the openings in the deck through which they are ultimately positioned. This is primarily because of the metal to metal contact between the nails and the deck and because the nail openings are often slightly larger than the nails. Further, because of the manner in which the openings have been made, i.e., by the driving force of the nails themselves, they do not generally conform to the shape of the nails.

In view of the difficulties just discussed, sheet insulation has heretofore been typically fastened to metal decks by means of screws. It should be quite apparent that this is extremely time consuming and, as a result, expensive compared to the use of nails which can be rapidly and easily driven through the sheets of insulation and into the underlying metal deck. As will be seen hereinafter, a fastener constructed in accordance with the present invention is disclosed. This fastener, like nails, can be driven through the sheets of insulation and into the deck by means of a hammer blow, thus eliminating the use of screws. In addition, the fastener disclosed herein does not have the drawback of a standard metal nail or even a serrated metal nail, which drawbacks have been discussed above.

SUMMARY OF THE INVENTION

An object of the present invention is to provide a fastener which is especially suitable for fastening down sheet insulation to a metal deck and which can be applied in the same manner as standard nails.

Another object of the present invention is to provide a fastener of the last-mentioned type which reliably holds the sheet insulation to the metal deck.

Still another object of the present invention is to provide a fastener which while it pierces through the metal deck producing an opening therethrough the fastener acts to liquid seal the opening.

A further object of the present invention is to provide a roof arrangement which includes a metal roof deck, roof insulation sheet material and means for fastening the sheet material to the deck including a fastener of the last-mentioned type.

In accordance with the present invention, this fastener includes a longitudinal body and a pointed metal tip affixed to one end of the body. In addition, the fastener body includes a circumferential outer portion located adjacent to and extending longitudinally back from the metal tip, preferably extending the entire length of the fastener body. This circumferential outer body portion has a maximum outer cross-section greater than the maximum outer cross-section of the metal tip and is constructed of a non-metallic material having a lower hardness than that of the metal tip. In a preferred embodiment of the present invention, this outer body portion is constructed of plastic but may, for example, be constructed of rubber or other suitable material which functions in the manner to be described.

The metal tip of the fastener is driven through the sheet material and metal deck, for example by means of a hammer, thus producing an opening in the sheet material and an opening in the deck. The non-metallic circumferential outer portion of the fastener body is provided with a maximum outer cross-section which is greater than the maximum cross-section of the resultant opening in the metal deck. The fastener ultimately extends through the openings in the sheet material and deck such that the metal tip is located under the deck directly below the deck opening and the outer circumferential portion of the fastener body is located in the deck opening. This outer circumferential portion is constructed of a non-metallic material, for example plastic or rubber as stated above, and has a hardness sufficiently less than the hardness of the metal tip and roof deck so as to fit into the deck opening without enlarging this opening and engages against the circumferential portion of the deck defining the deck opening to liquid seal this opening.

In a preferred embodiment, the non-metallic circumferential outer portion of the fastener body includes a plurality of integral longitudinally adjacent outer circumferential ribs, for example defined by serrations, located in planes normal to the axis of the fastener body. At least one of these ribs is located under the deck directly below the opening whereby to prevent easily removal of the fastener from the deck opening and hence to minimize separation of the sheet material from the deck.

BRIEF DESCRIPTION OF THE DRAWING

FIG. 1 is a elevational view in longitudinal section of a roof arrangement including a fastener constructed in accordance with one embodiment of the present invention.

FIG. 2 is an elevational view, partially in longitudinal section, of the fastener illustrated in FIG. 1.

FIG. 3 is an elevational view, partially in longitudinal section, of a fastener constructed in accordance with a second embodiment of the present invention.

FIG. 4 is a perspective view of a fastener constructed in accordance with still another embodiment of the present invention.

DETAILED DESCRIPTION AND PREFERRED EMBODIMENTS

Turning to the drawing, attention is directed to FIG. 1 which illustrates a roof arrangement in accordance with the present invention and generally designated by the reference numeral 10. Arrangement 10 includes a metal roof deck 12 and roof insulation in sheet material form generally designated by the reference numeral 14. Deck 12 may be constructed of any suitable metal, generally steel but may be an alloy such as aluminum or the like. The deck is generally between 18 to 22 gauge metal but may be of any suitable thickness so long as the fastener to be described can be readily driven through the deck. The insulation 14 may be of any suitable type. One type of insulation typically used is constructed predominantly of perlite with minor portions of vegetable fiber and binder. Insulation board of this general type is sold by Johns-Manville Corporation under the trademark FESCO board.

Roof arrangement 10 also includes one or more fasteners constructed in accordance with the present invention. One such fastener, constructed in accordance with one embodiment of the present invention, is illustrated in FIGS. 1 and 2 and generally designated by the reference numeral 16. As best seen in FIG. 2, this fastener includes a longitudinal fastener body 18 having a front end 20 and a back end 22. A pointed metal tip 24 is affixed to the front end 20 and a metal head 26 is affixed to back end 22.

As also best illustrated in FIG. 2, body 18 includes a central metal core 28 extending longitudinally between and connected with tip 24 and head 26. Body 18 also includes an outer core or circumferential portion 30 which completely circumscribes inner core 28 and which, as shown in FIG. 1, extends the entire length of body 18 from tip 24 to head 26.

Inner metal core 28 may be an initially separate component from tip 24 and head 26 but is preferably formed as an integral component. For example, an integrally made metal nail having tip 24, and head 26 and a shaft 28 could be utilized. Outer core or outer circumferential portion 30 is constructed of a material of less hardness than that of metal head 24 and may be of any suitable material which meets this criteria and also functions in the manner to be described hereinafter. Outer core 30 is preferably plastic, for example polyvinyl chloride, nylon, epoxy or any engineering plastic. It can however also be constructed of a relatively hard rubber base material, for example polyurethane having for example a durameter of between Shore D65 to R119.

Fastener 16 is manufactured in any suitable manner so as to include outer core 30 fixedly positioned around inner core 28. This can be done for example by means of molding. In this regard, inner core 28, i.e., the shaft of a nail if a nail is used, preferably includes longitudinally adjacent circumferential serrations 32 located along the outer surface length of the inner core and complimentary serrations 34 are preferably located along the length of the inner surface of outer core 30. These serrations 32 and 34 interlock to one another to aid in preventing relative longitudinal movement of the outer core 30 and inner core 28.

As illustrated in both FIGS. 1 and 2, outer core 30 includes integral longitudinally adjacent outer circumferential ribs 36 which, as shown best in FIG. 2, are located in planes normal to the axis of the fastener body. These ribs may be of a saw tooth type as shown more or less defined by serrations in the outer core or they may take any other suitable configuration so that they function in the manner to be described. Ribs 36 preferably extend the entire length of body 18. In addition, the maximum outer cross-section of outer core 30 including ribs 36, i.e., from rib tip to rib tip, is greater than the maximum outer cross-section of metal tip 24, i.e., the outer cross-section of the base of tip 24 as illustrated in FIGS. 1 and 2. The reason for this will also become apparent hereinafter.

Having described fastener 16, attention is now directed to the manner in which it secures insulation 14 to metal deck 12. In this regard, the fastener is treated like a standard nail in that it is driven through the insulation and deck by means of a hammer or other such means. This, of course, results in an opening 40 in the insulation and an opening in the deck through which the fastener extends. In its final position, as illustrated in FIG. 1, tip 24 and a bottom portion of body 18 are located under metal deck 12 directly below deck opening 40. A portion of the fastener body is located in the deck opening and a portion is located in the insulation opening. Head 26 rests against the top surface of the insulation and a washer 42, if one is used, is disposed around inner core 28 directly under head 26 and rests directly against the top surface of the insulation 14.

As stated previously, outer core 30 including ribs 36 has a maximum cross-section which is greater than the maximum cross-sectional of metal tip 24. As also stated previously, the outer core is constructed of a material, for example plastic, which has a lower hardness than metal tip 24. As the metal tip pierces through metal deck 12 it produces an opening in the deck, opening 40, which due to the deformation in the metal surround the opening is at most slightly greater in cross-section than the maximum cross-section of tip 24. Whatever material is chosen for outer core 30, it must be one which does not increase the size of deck opening 40 as the outer core moves through it. In addition, the maximum outer cross-section of the outer core must be sufficiently close to that of the opening, although slightly larger, so as not to increase the size of the opening. In other words, core 30 must be constructed of a non-metallic material having a hardness sufficiently less than the hardness of the metal tip and roof deck and must have sufficient give depending on it cross-section so as to fit into deck opening 40 without enlarging the latter. Obviously, if the outer core is of a relatively hard plastic (not as hard as the metal tip) but is substantially larger than opening 40, it could enlarge the opening. The core must also be of a material which is sufficiently elastic so that once the outer core is in the opening, as shown in FIG. 1, it tightly engages the circumferential portion of the deck defining the deck opening to liquid seal this opening, again without enlarging the opening.

By choosing the proper material for core 30, for example those discussed above, after tip 24 pierces through the deck producing opening 40, outer core 30 moves through this opening either compresses or deforms, depending upon the material making up the outer core, so as to squeeze into the smaller opening and engage against its outer circumferential periphery, hence sealing the opening. While this function can be achieved without the use of ribs 36 (see FIG. 4), these ribs are preferably provided to aid in preventing the fastener from moving out of the opening and hence to aid in keeping insulation 14 secure against deck 12. The way this is accomplished is illustrated in FIG. 1. As seen in this figure, one of the ribs is positioned under and against deck 12 directly below opening 40 and because the outer core 30 including the ribs have a maximum cross-section greater than the deck opening, the ribs extend transversely beyond the opening so as to prevent easy removal of the fastener.

The exact size of fastener 16 including the dimensions of its various components will depend largely on its application including for example the thickness and hardness of deck 12, the particular material making up insulation 14 and its thickness and the particular material making up the components of the fastener itself. Where, for example, fastener 16 is used in conjunction with a typical 18 to 22 gauge metal deck and perlite insulation board having a 1 to 2 inch thickness, the fastener is preferably between approximately 1¾ and 2¾ inches long from tip to head. The maximum cross-section of tip 24 is approximately 3/32 inch and the maximum cross-section of body 18 from rib tip to rib tip is approximately 5/32 (depending on the material making up core 30). The cross-sectional thickness of outer core 30, from its inner surface to its outer surface, will depend on particular material making up the outer core. This thickness will also depend upon the difference in cross-sections between inner core 28 and tip 24 since the maximum cross-section of body 18 must be greater than the maximum cross-section of the tip. The thickness of the outer core must also be sufficient to function in the manner described, i.e., to pass through opening 40 and either compress or deform so as not to substantially enlarge the opening and to seal the deck opening once located therein. With these factors in mind, one with skill in the art could determine the thickness of the outer core.

Having described fastener 16 and roof arrangement 10 including this fastener, attention is now directed to FIG. 3 for a description of a fastener 16' which is constructed in accordance with a second embodiment of the present invention. This fastener is identical in function to that of fastener 16. Like fastener 16, fastener 16' includes a metal tip 24', a longitudinally extending body 18' having longitudinally adjacent outer circumferential ribs 36' which may or may not extend the entire length of the fastener body and a head 26'. The respective dimensions of body 18', ribs 36' and point 24' may be identical to the corresponding dimensions of fastener 16. The major difference between fastener 44 and fastener 16 is that fastener 44 does not include an inner core corresponding to previously described core 28. Rather, body 18' is integrally formed of plastic, i.e., the same plastic material making up outer core 30 of fastener 16 where plastic is used in making outer core 30. In this regard, head 26' is also constructed of plastic and comprises an integral part of body 18'.

Tip 24' can be affixed to the bottom end of body 18' in any suitable manner. However, as illustrated in FIG. 3, metal tip 24' includes a longitudinally extending shank 46 having a cross-section less than the cross-section of body 18' and longitudinally shorter than the latter. This shank extends into the body from the front end thereof and is secured in place to hold tip 24' in place. It is to be understood that body 18' is not limited to one of the plastic materials described above but if another material is used it must be one which allows the fastener to function in the manner described above and in addition, since a metal inner core is eliminated it must one which is sufficiently rigid to allow the fastener to be driven through insulation 14 and metal deck 12.

FIG. 4 illustrates a fastener 16' which is identical to fastener 16 except that the outer core of its body is smooth and does not include ribs 36. In addition, the inner surface of the outer core and the outer surface of the inner core may or may not include complimentary ribs similar to ribs 32 and 34. As shown in FIG. 4, these complimentary ribs have been omitted.

I claim:

1. A fastener comprising:
   a. a substantially solid plastic longitudinal body having a front end portion of predetermined maximum outer cross-section, said outer portion extending from said front end to said back end, said outer portion including,
      i. a plurality of integral longitudinally adjacent outer circumferential ribs located in plane normal to the axis of said body, said ribs together extending the length of said outer portion;
   b. a pointed metal tip affixed to the front end of said body, said tip having a maximum outer cross-section less than the predetermined maximum outer cross-section of the outer portion of said body;
   c. an integral longitudinal shank having a cross-section less than the cross-section of said body and longitudinally shorter than said body, said shank extending into said body from the front end thereof;
   d. said shank and an inner surface of said body including longitudinally interlocked complementary serrations; and
   e. a plastic head integrally connected with the back end of said body, said head having a greater outer cross-section than said body.

2. A roof arrangement comprising:
   a. a metal roof deck;
   b. roof insulation sheet material positioned on top of said deck; and
   c. means for fastening said sheet material to said deck, said means including at least one fastener, said fastener comprising,
      i. a plastic longitudinal body having a front end, a back end and a circumferential outer portion of predetermined maximum outer cross-section, said outer portion extending from said front end to said back, said outer portion including a plurality of integral longitudinally adjacent outer circumferential ribs located in planes normal to the axis of said body, said ribs together extending the length of said outer portion;
      ii. a pointed metal tip affixed to the front end of said body, said tip having a maximum outer cross-section less than the predetermined maximum outer cross-section of the outer portion of said body;
      iii. said body including a longitudinal metal inner core extending the length of and coaxially with said outer portion concentrically within said outer portion, said core being connected at one end with said metal tip;
      iv. said core and the inner surface of said outer portion including longitudinally interlocked complementary serrations; and v. a metal head integrally connected with the otherwise free end of said core, said head having a greater outer cross-section than said core;
d. said fastener extending through an opening in said sheet material and an opening in said roof deck, said openings having resulted from driving the metal tip of said fastener through said sheet material and deck, said opening in said deck having a maximum diameter less than the maximum diameter of said outer portion of said body;
e. said fastener being positioned relative to said roof deck and sheet material such that,
   i. said metal tip is located under said deck directly below said opening in said deck, and
   ii. said outer portion of said body is located in said deck opening; and
f. the outer portion of said fastener body fitting into said deck opening without enlarging the latter, said outer portion engaging against the circumferential portion of said deck defining said deck opening to liquid seal said deck opening around said outer portion.

3. A roof arrangement comprising:
a. a metal roof deck;
b. roof insulation sheet material positioned on top of said deck; and
c. means for fastening said sheet material to said deck, said means including at least one fastener, said fastener comprising,
   i. a substantially solid plastic longitudinal body having a front end, portion of predetermined maximum outer cross-section, said outer portion extending from said front end to said back, said outer portion including a plurality of integral longitudinally adjacent outer circumferential ribs located in planes normal to the axis of said body, said ribs together extending the length of said outer portion;
   ii. a pointed metal tip affixed to the front end of said body, said tip having a maximum outer cross-section less than the predetermined maximum outer cross-section of the outer portion of said body; and an integral longitudinal shank having a cross-section less than the cross-section of said body and longitudinally shorter than said body, said shank extending into said body from the front end thereof;
   iii. said shank and an inner surface of said body including longitudinally interlocked complementary serrations; and
   iv. a plastic head integrally connected with the back end of said body, said head having a greater outer cross-section than said body;
d. said fastener extending through an opening in said sheet material and an opening in said roof deck, said openings having resulted from driving the metal tip of said fastener through said sheet material and deck, said opening in said deck having a maximum diameter less than the maximum diameter of said outer portion of said body;
e. said fastener being positioned relative to said roof deck and sheet material such that,
   i. said metal tip is located under said deck directly below said opening in said deck, and
   ii. said outer portion of said body is located in said deck opening; and
f. the outer portion of said fastener body fitting into said deck opening without enlarging the latter, said outer portion engaging against the circumferential portion of said deck defining said deck opening to liquid seal said deck opening around said outer portion.

* * * * *